United States Patent
Himmel et al.

(10) Patent No.: US 6,223,178 B1
(45) Date of Patent: *Apr. 24, 2001

(54) SUBSCRIPTION AND INTERNET ADVERTISING VIA SEARCHED AND UPDATED BOOKMARK SETS

(75) Inventors: Maria Azua Himmel; Herman Rodriguez; Jeffrey Scott LaBaw, all of Austin, TX (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/116,859

(22) Filed: Jul. 16, 1998

Related U.S. Application Data

(62) Division of application No. 09/080,022, filed on May 15, 1998.

(51) Int. Cl.$^7$ .................................................. G06F 17/30
(52) U.S. Cl. ........................ 707/10; 707/203; 707/513; 709/218
(58) Field of Search ..................................... 707/4, 5, 102, 707/104, 10, 203, 513; 345/335, 349; 706/10; 709/217–219

(56) References Cited

U.S. PATENT DOCUMENTS 5,784,562 * 7/1998 Diener ............................. 395/200.47
5,812,776 * 9/1998 Gifford ............................ 395/200.47
5,848,410 * 12/1998 Walls et al. ............................... 707/4

* cited by examiner

Primary Examiner—Hosain T. Alam
Assistant Examiner—Jean Bolte Fleurantin
(74) Attorney, Agent, or Firm—David H. Judson; David A. Mims, Jr.

(57) ABSTRACT

One or more searchable repositories of bookmark sets are stored in a computer system, each bookmark set can be downloaded to a client browser as a unit. Each bookmark set contains a set of Uniform Resource Locators (URLs) and is associated with related information such as a set of keywords, one or more topics and user specific information. The bookmark set is downloadable as a unit to the client browser. When a search query from a client containing a set of keywords is received, the stored bookmark sets are searched for one or more bookmark sets associated with at least one keyword matching a keyword from the search query. A list of bookmark sets which satisfy the query, i.e. are associated with matching keywords, are returned to the client browser. Responsive to a request for downloading a selected bookmark set, the selected bookmark is served to the client. The selected bookmark set is received and used by the client browser to access the set of URLs in the selected bookmark set. In one embodiment of the invention, some bookmarks within a bookmark set are designated as base bookmarks which are always served with the bookmark set. Other bookmarks in the bookmark set are designated as variable bookmarks which are served with the bookmark set if a set of conditions are met, e.g., the client request originates from a specific geographic region. If the set of conditions is detected the base and variable bookmarks are served as a unit as the selected bookmark set.

20 Claims, 4 Drawing Sheets

SUBSCRIPTION AND INTERNET ADVERTISING VIA SEARCHED AND UPDATED BOOKMARK SETS

This application is a divisional of 09/080,022, filed May 15, 1998.

BACKGROUND OF THE INVENTION

This invention relates generally to information retrieval in a computer network. More particularly, it relates to an improved method for providing a set of bookmarks in a browser for retrieving Web pages in an Internet environment.

It is well known to couple a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience. The Internet has become a cultural medium in today's society for both information and entertainment. Government agencies employ Internet sites for a variety of informational purposes. For many companies, one or more Internet sites are an integral part of their business; these sites are frequently mentioned in the companies' television, radio and print advertising.

The World Wide Web, or simply "the Web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g., text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML. Web browsers have become the primary interface for access to many network and server services.

The entry of the URL in the entry field of a browser can be a difficult task for many users. While the URL for the main Web page of a major company can be relatively brief, e.g., www.ibm.com, subsidiary pages can have very lengthy URLs in, at least to the average user, an arcane syntax. Recognizing the difficulties involved, the developers of browsers have provided one useful means of returning to a favorite URL, by the creation of user stored "bookmarks" in the browser.

Once created, bookmarks offer a means of page retrieval. The user can cause the browser to display his bookmark list and select among his bookmarks to go directly to a favorite page. Thus, the user is not forced to enter a lengthy URL nor retrace the original tortuous route through the Internet by which he may have arrived at the Web site. Once a bookmark is added to a bookmark list, in general, the bookmark becomes a permanent part of the browser until removed. The permanence and accessibility of bookmarks have made them a valuable means for personalizing a user's Internet access through the browser.

Yet despite their usefulness, the current arrangement of bookmarks is not without its flaws. As the numbers of web sites and web pages on these sites have increased dramatically, so has the number of bookmarks that a typical web browser user maintains on his browser. It is not uncommon that hundreds of bookmarks be stored in a bookmark file after a few weeks of web browsing. While folders in some browsers have helped the user group his bookmarks by category, in reality, the bookmark file is one huge list of bookmarks, all accessible to the user through the browser. The most common way of adding bookmarks to the bookmark file or a particular bookmark folder in the browser is manually intensive. Each bookmark is added one at a time. A user visits a web site, then selects that site as a bookmark entry and, if desired, categorizes it manually. Furthermore, the current technology used in browsers to update bookmarks, i.e. removing the old address and entering the new one, is very slow and inefficient.

Another problem with retrieving information on the Internet is the amount of time required to sift through the enormous amount of information available to find the relatively few web pages or files of interest. Search engines help to a degree, but user's respective facility with constructing search queries differ greatly. A substantial amount of user time is required to refine search strategies and compile and discard results and so forth. Thus, a good list of bookmarks on a given topic can represent a significant investment in time and effort. Presuming that the topic is of interest to others as well, the list of bookmarks is a valuable commodity which others would be interested in sharing and perhaps buying.

These problems as well as others are addressed in various embodiments of the present invention.

SUMMARY OF THE INVENTION

Therefore, it is an object of the invention to improve the management of bookmarks in the browser.

It is another object of the invention to provide a search mechanism for bookmark sets usable in a browser.

It is another object of the invention to subscribe to receive automatically updates to a selected bookmark set.

It is another object of the invention to customize a served bookmark set for a given client browser based on machine or user provided parameters.

It is another object of the invention to provide a new electronic advertising medium.

These and other objects are accomplished by providing one or more searchable repositories of bookmark sets stored in a computer system, each bookmark set can be downloaded to a client browser as a unit. Each bookmark set contains a set of Uniform Resource Locators (URLs) and is associated with related information such as a set of keywords, one or more topics and user specific information. The bookmark set is downloadable as a unit to the client browser.

When a search query from a client containing a set of keywords is received, the stored bookmark sets are searched for one or more bookmark sets associated with at least one keyword matching a keyword from the search query. A list of bookmark sets which satisfy the query, i.e. are associated with matching keywords, are returned to the client browser. Responsive to a request for downloading a selected bookmark set, the selected bookmark is served to the client. The selected bookmark set is received and used by the client browser to access the set of URLs in the selected bookmark set.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a personal computer, a mini computer, mainframe computer or a computer running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (TM) line of computers which run on the AIX (TM) operating system.

Figure 1:
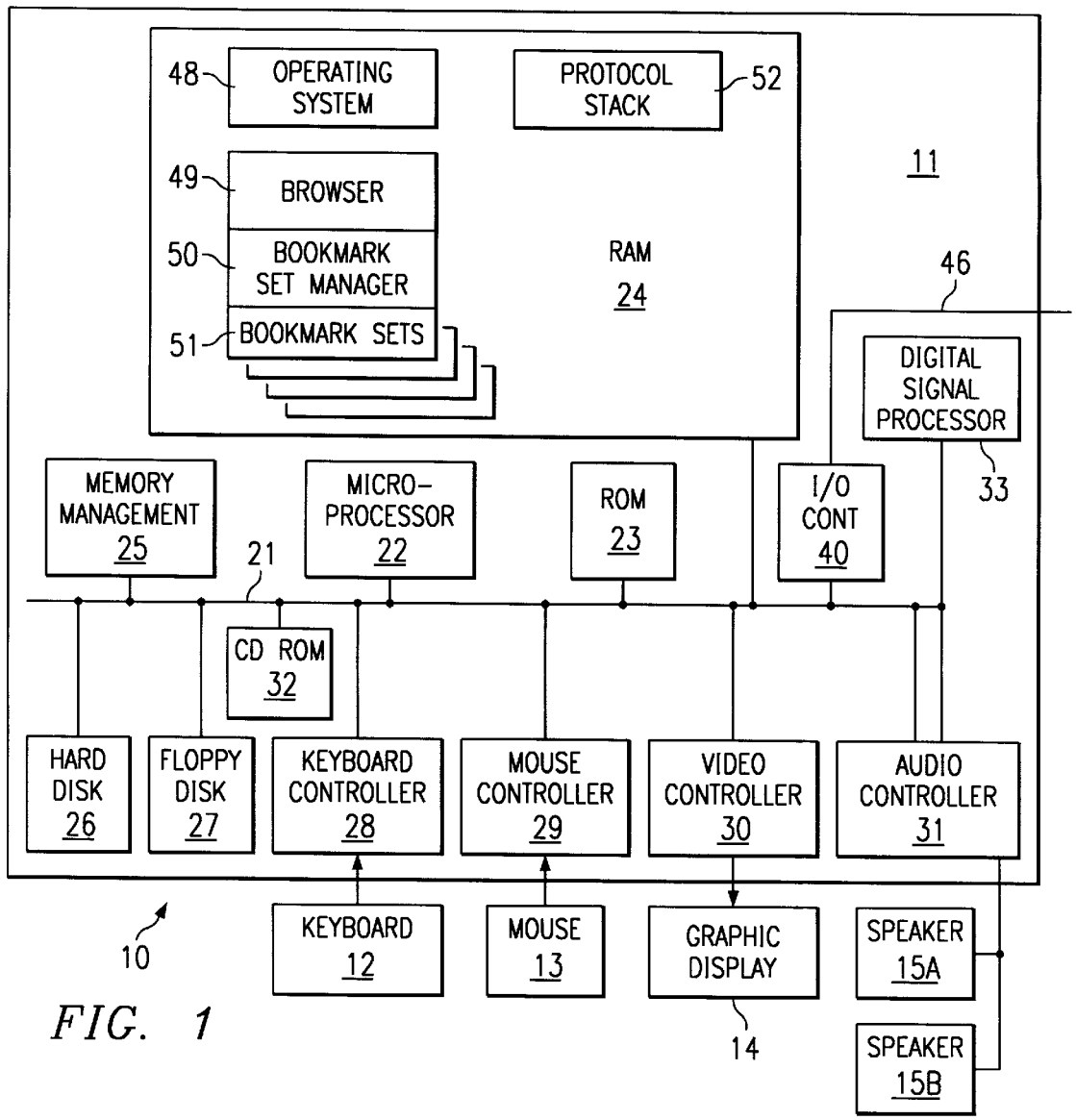
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

A web browser is a program that allows viewing the content of the Internet. A well known web browser is Netscape Navigator, however, many browsers exist. Some are general purpose and have many capabilities to provide a variety of functions. Other are less capable and are special purpose. In general, a web browser is a program which is capable of parsing and presenting a document written in HTML, although those skilled in the art would, appreciate that other markup languages such as dynamic HTML and XML will be used in the browsers of the future.

The idea of creating "bookmark sets" has been proposed by the inventors in copending, commonly assigned application, Ser. No. 08/977,634, Attorney Docket No. AT9-97-443 entitled "Web Browser Download of Bookmark Set", by Azua et al. filed Nov. 11, 1997, which is hereby incorporated by reference. In the referenced application, a bookmark set is associated with a web server and/or web page and downloaded to a client browser by either a push or pull operation. In some embodiments of the referenced application, the bookmark set is associated with a given web page which has already been located by the user. In other embodiments, a network administrator pushes a bookmark set as a means of controlling or guiding a set of client browsers.

In the present invention, the browser must also be equipped with a bookmark set manager, a software module which handles bookmark sets. Each bookmark set is comprised of referents, typically URLs, to various locations in the Internet as well as text descriptions of the locations. The bookmark manager is preferably part of the browser itself, but could be installed in the browser as a plug-in or Java applet. Each bookmark entry is comprised of a URL to a web page and an associated descriptive text string which describes the web page in such a way to be easily recognized by the user. The descriptive text can be entered by the user when creating the bookmark set. The typical browser default, when the user does not enter any descriptive text, is to use the text within an embedded "title" tag which is often sent as part of the HTML header. Other information such as pointers to cached copies of the web page can be included in the bookmark entry.

By means of background, in the Internet, a Web server accepts a client request and returns a response back to the client. A series of server computers may be involved in the retrieval of a specific web page. The operation of the server program is governed by a number of server application functions (SAFs), each of which is configured to execute in a certain stop of a sequence. This sequence, illustrated in FIG. 2, begins with the authorization translation step 75 during which the web server translates any authorization information sent by the web client into a user and a group. If necessary, the step 75 may decode a message to get the actual client request. At the name translation step 77, the URL associated with the request may or may not be translated into a system-dependent file name, a redirection URL or a mirror site. In the path checks step 79, the server performs various tests on the resulting path to ensure that the given client may retrieve the document.

In step 81, Multipurpose Internet Mail Extension (MIME) type information, e.g., text/html, image/gif, for the given document is recognized. In the service step 83, the Web server routine selects an internal server function to send the retrieved information back to the requesting web client. This function can run the normal server service routine to return a file or some other server function, such as a program to return a custom document or a CGI program. At the Add Log step 85, information about the transaction is recorded.

A URL or "Uniform Resource Locator" is defined in RFC 1945, which is incorporated herein by reference. As is well known, the URL is typically of the format: http://somehost/somedirectory?parameters . . . " where "somehost" is the hostname position of the URL, "somedirectory" is a directory in which the web page may be found. The usual manner in which a URL is resolved into an actual IP address for a web server is through the use of a nameserver. In an internet or intranet network, a nameserver maps hostnames in URLs to actual network addresses. An example of a nameserver is the Domain Name Service (DNS) currently implemented in the Internet. The process of having a Web client request a hostname and address from a nameserver is sometimes called resolution. In TCP/IP, the nameserver resolves the hostname into a list of one or more IP addresses which are returned to the Web client on an HTTP request. Each IP address identifies a server which hosts the requested content made by the browser.

In one preferred embodiment, a bookmark set is an entity which has attributes of its own, e.g., active vs. inactive, and manages attributes and behavior, e.g., dynamic vs. static, of its individual bookmarks. Further, an action such as selection, deletion or e-mail transmission can be accomplished for the entire set in a single operation by the user. A bookmark set could be designated active in many ways. For example, a bookmark set can be activated through a browser configuration option. The browser can be configured so that a newly served bookmark set automatically becomes the active bookmark set in the browser. Alternatively, a "Select active bookmark set" option in a bookmark pulldown can used to specify the unique bookmark set that is active at any one session.

As described below, the invention allows a bookmark set creator to create specific and unique bookmark sets for each of a plurality of topics or tasks for which he expects others will use their browser. By accumulating information, i.e. URLs, which others consider useful, he is able to disseminate or charge others for disseminating other advertising like information.

Figure 3:
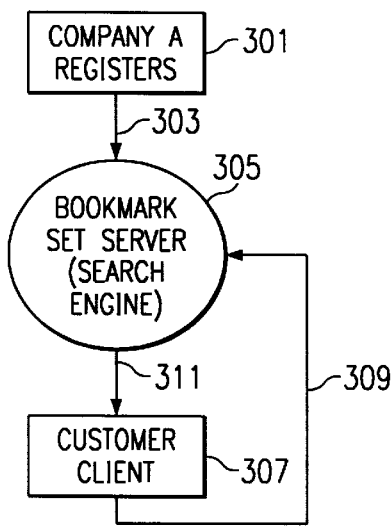
FIG. 3 shows a diagram of the overall process for searching and serving bookmarks in a distributed database environment.

The overall process is depicted in FIG. 3. In this particular embodiment, the bookmark set is created at workstation 301 and uploaded 303 to the bookmark set server 305. Creation of the bookmark sets could be performed on the same machine, however, this figure allows discussion of several more probable embodiments of the invention.

In one embodiment of the invention, the bookmark set server 305 is owned by one organization which charges a fee to other organizations to post and serve their bookmark sets. In this case, workstation 301 belongs to company A which creates and uploads the bookmark set. In a second embodiment of the invention, the organization which owns the bookmark set server 305 also creates the bookmark sets. Workstation 301 would simply be the personal machine of the bookmark set creator within the organization. In the second embodiment, fees could be collected for the inclusion of a URL in a given bookmark set. The second embodiment allows for better quality control of the bookmark sets which in turn increases the likelihood of a widespread recognition of the value of the bookmark set as an advertising medium.

Once the bookmark server 305 is connected to the Internet, or other network, clients 307 can search 309 and download 311 bookmark sets from the server 305. The actual search could be conducted from a general purpose search facility such as www.yahoo.com wherein a "bookmark set" category is selected and one or more search terms are entered in a search field. Alternatively, a specialized search page served by the bookmark set server could be used to submit the customer's search. In general, the search criteria will include one or more keywords, possibly a category of bookmark sets as well as a client identifier. The client identifier can include in addition to the client's machine address, credentials such as authentication and account information. Therefore, in one embodiment of the invention, only authorized or paying clients are allowed access to all or selected bookmark sets. Further, as is described below, the client information can be used to modify the selected bookmark set composition.

Several bookmark sets may satisfy the client's search criteria. Upon selection by the client of one or more of the bookmark sets which satisfy the search criteria, the bookmark sets are downloaded 311 and integrated into the bookmark set manager of the browser. Preferably, a newly downloaded bookmark set is made active or accessible by the browser and the user can use the bookmark set to access the included URLs.

Figure 4:
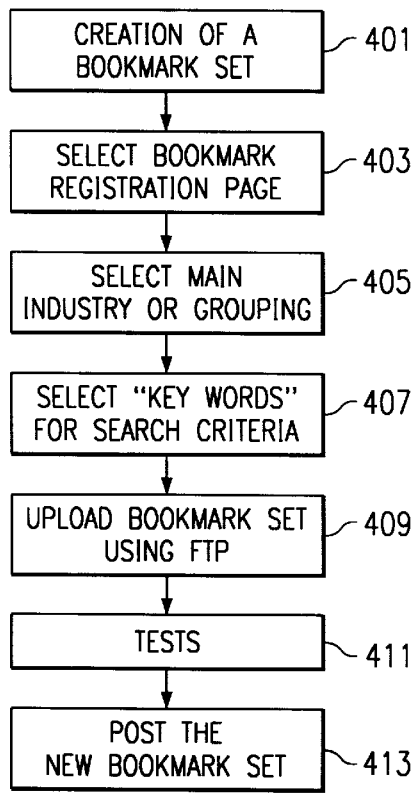
FIG. 4 is a flow diagram of registering a bookmark set with a bookmark set server.

FIG. 4 depicts the registration of a bookmark set with the bookmark set server in greater detail. Step 401 depicts the creation of the bookmark set. Although depicted as a single step, it may actually represent a great deal of research activity for available web pages and possibly the creation of web pages and placing a web server in operation. The bookmark set itself primarily contains the URLs to a selected set of web pages. Generally, each bookmark is associated with the descriptive text so that a user can understand the general content of the page without actually retrieving the page. Other information such as keywords or an abstract could be included in the bookmark set entry of the present invention. The entry of the bookmark set data could be accomplished manually in a FTP form. Alternatively, editing tools to generate bookmark sets can be developed.

A sample bookmark set for "patent law" or "patent lawyer" follows:

| | |
|---|---|
| www.iplaw.com | Intellectual Property Law |
| www.iplaw.com/pat/index/html | Patent page |
| www.iplaw.com/copy/index/html | Copyright page |
| www.iplaw.com/mark/index/html | Trademark page |
| www.uspto.gov | U.S. Patent Office |
| cweb.loc.gov | Copyright Office |
| www.smartrwe.com | Law firm |

The majority of the bookmark set includes URLs to useful articles and links to Intellectual Property sites. An "advertising" bookmark, www.smartrwe.com, for a law firm providing intellectual property services is also included in the bookmark set.

In step 403, the bookmark set creator has requested the bookmark set registration page from the bookmark set server. This registration page is typically written in HTML and is downloaded and presented by the local browser. Those skilled in the art would appreciate that the registration page is merely an illustrative method of registering the bookmark set with the server and that other methods such as file transfer are possible. The URL and associated information is entered in the registration page by the bookmark set creator. Also, in step 405, a main industry or grouping is selected, e.g., banking, health, sports, to differentiate the bookmark set from others. In step 407, the keywords selected by the bookmark set creator are entered in the registration page. These are the keywords which if entered by a requesting client as search criteria should result in the bookmark set being returned to the requesting client's browser.

In step 409, the registration page is uploaded to the bookmark server. At this point, the server may run several tests 411 on the registration page and included bookmark set. Tests that the information is entered correctly and that the URLs listed point to active web pages are conducted. The server may have policies against serving certain sites or types of material, e.g., pornographic. If so, tests are conducted to assure that none of the bookmarks lead to such items. Too many advertisements may dilute the value of the bookmark set. The tests may also include verification that the best keywords and categories have been chosen by the bookmark set creator as the bookmark set server has an interest in the quality of the bookmark sets returned by given search criteria. Words which are too common which could cause the bookmark set to be retrieved in an unrelated search are candidates for deletion. Parsing abstracts or the web pages to which the URLs point for words which occur frequently in the web pages, but are relatively infrequently used in the language of the web pages, could be performed to nominate other keywords. The set of keywords to be deleted or added would be transmitted to the bookmark set creator for approval. Finally, tests to determine authorization and account information to determine that the bookmark creator is authorized to post bookmark sets and has made the necessary financial arrangements would be performed.

Once the server is satisfied that the bookmark set and bookmark set creator meet the desired criteria, in step 413, the bookmark set server makes the new bookmark set available to potential customers. Posting adds the bookmark set to a database organized for future searching. These operations are well known to the art.

Figure 2:
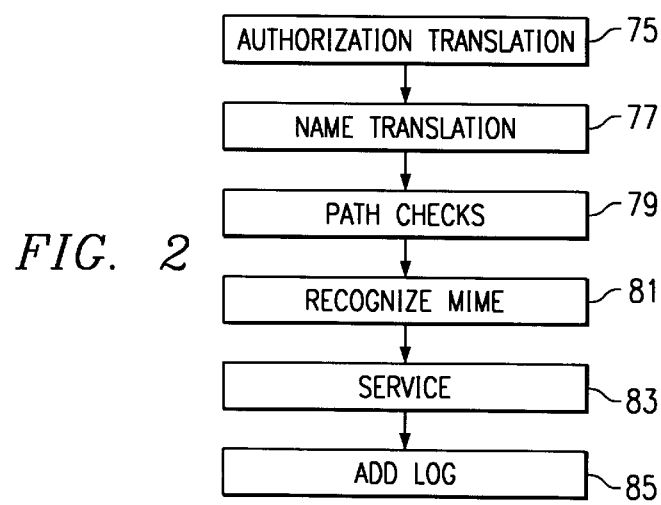
FIG. 2 depicts the processing of an HTTP request in the Internet environment.
Figure 5:
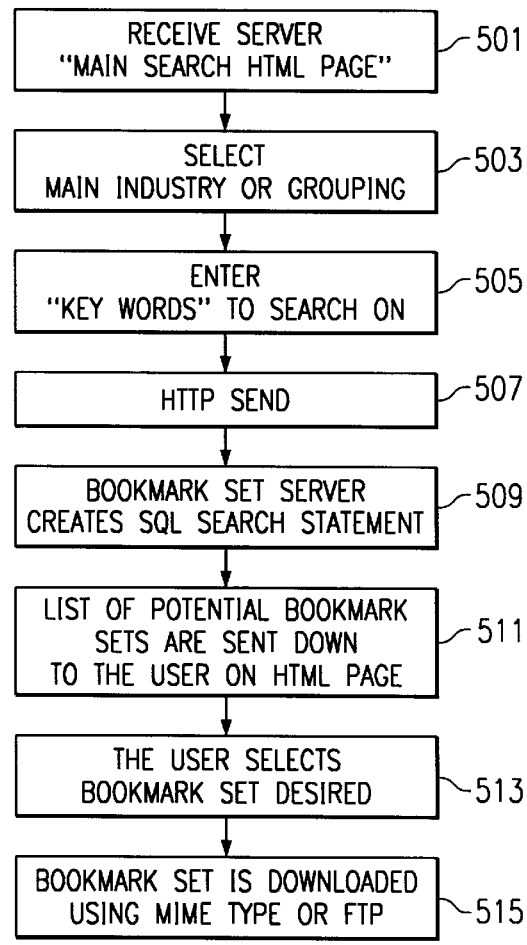
FIG. 5 is a flow diagram of retrieving a bookmark set from the bookmark set server.

One exemplary search process is depicted in FIG. 5. The depicted process does not include any dialog for authorization or account information from the client. However, as shown in FIG. 2, in alternative embodiments of the invention such interchanges can occur. In step 501, the client browser connects to the search server and downloads the search page. As mentioned above, the search page may be from a general purpose search engine, e.g., www.yahoo.com, with a bookmark set category or may be a search page from the bookmark set server itself. Presuming the latter, in step 503, the selected main industry or group is entered. This step is optional. In step 505, the keywords which form the basis of the search criteria are entered. In step 507, an HTTP message with the keywords and category are sent to the search engine. In step 509, the search engine in the bookmark server constructs an SQL search query and sends the search query to the database which contains the bookmark set information. In step 511, a list of the bookmark sets which match the search criteria is compiled and sent to the client browser in an HTML page. In step 513, the selection of a bookmark set is detected and sent back to the server.

Although not shown, the invention also may include the compilation of customization information as part of the selection process, resulting in a customized bookmark set. For example, user profile information could be collected as part of starting an account, authorization or subscription process. Given the client identifier, such information can be correlated to the current bookmark set search. Alternatively, the geographic locale of the client browser can be detected through the IP address. Depending on the user profile or locale information collected in this manner, a different set of advertiser bookmarks can be included in the ultimately served bookmark set. Thus, the selected bookmark set can comprise a base set of informational bookmarks and a variable set of advertiser bookmarks. If locale or other customization information associated with a special set of advertiser bookmarks is not detected, a default set of advertiser bookmarks is used. In other embodiments of the invention, the substituted set of bookmarks may not be advertiser bookmarks, but some other type of bookmarks. In step 515, the selected bookmark set is downloaded to the client system and integrated into the browser.

Figure 6:
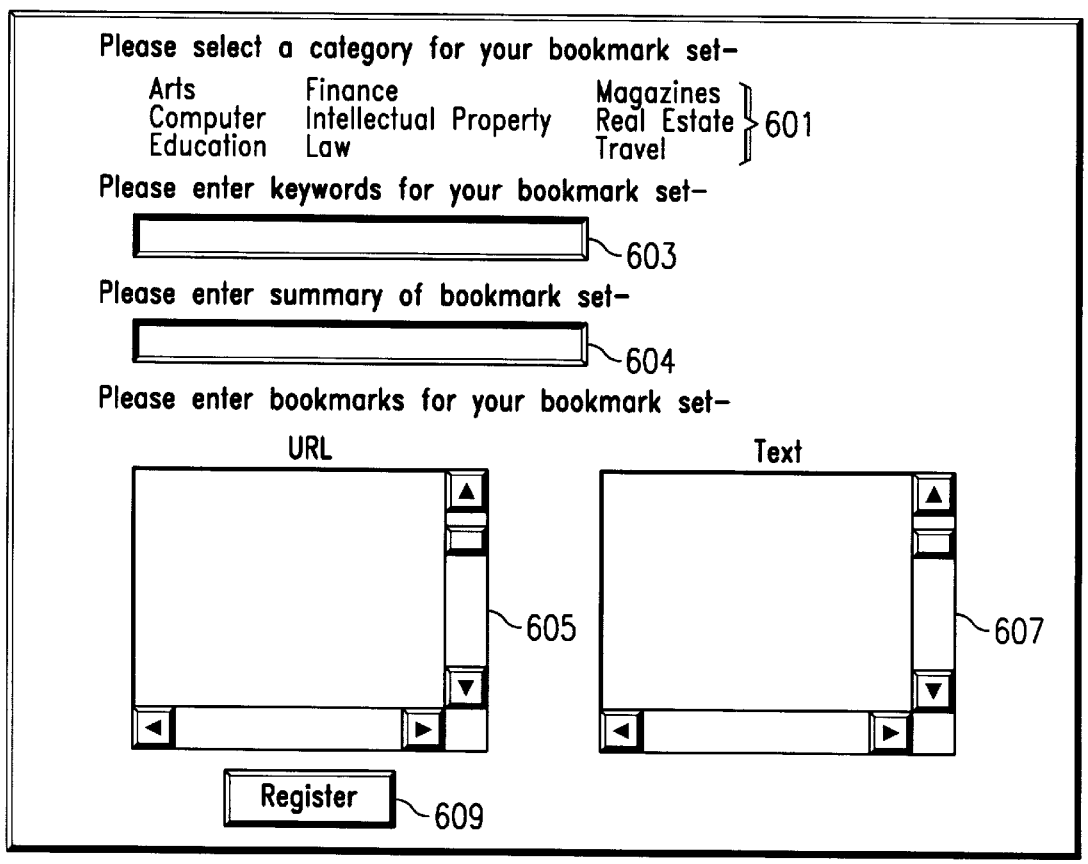
FIG. 6 shows a user interface to register a bookmark set with associated categories and keywords.

One sample registration page by which a bookmark set creator could register his bookmark set is depicted in FIG. 6. A set of categories 601 is selected by manipulation of the mouse pointer and buttons. Alternative controls such as check boxes are known to the art. A field 603 for entry of keywords is provided. A field 604 for the entry of a title or brief summary of the bookmark set is provided. The title or summary would be presented in the page of bookmark sets which meet the client's search criteria. Fields 605 and 607 are provided for entry of the URLs and descriptive text for the bookmark entries themselves. In the figure, scroll bars are depicted for the entry of more bookmarks than can be accommodated in the limited display space. Alternatively, a second page with individually defined entry fields can be used for entry of the bookmark set information.

Once all the information is entered, a push button 609 is activated to send the completed page to the bookmark set server for registration.

Figure 7:
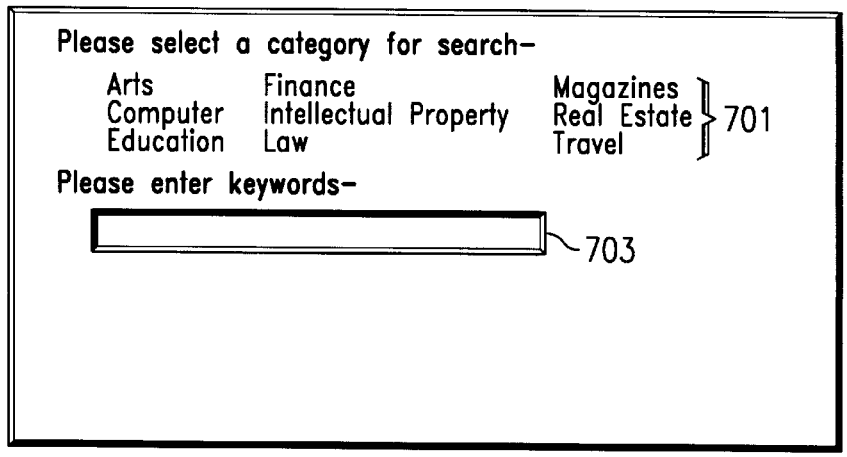
FIG. 7 shows a user interface for searching for a bookmark set.

FIG. 7 shows a simple interface for a web page for conducting a bookmark set search. In this example, a set of categories 701 can be selected and keywords entered in an entry field 703. Of course, as is well known to those skilled in the art, much more complicated search statements can be constructed using a plurality of search words and Boolean operators. More complicated search criteria can be accommodated in alternative embodiments of the invention by using a page with multiple entry fields and/or pulldowns.

Figure 8:
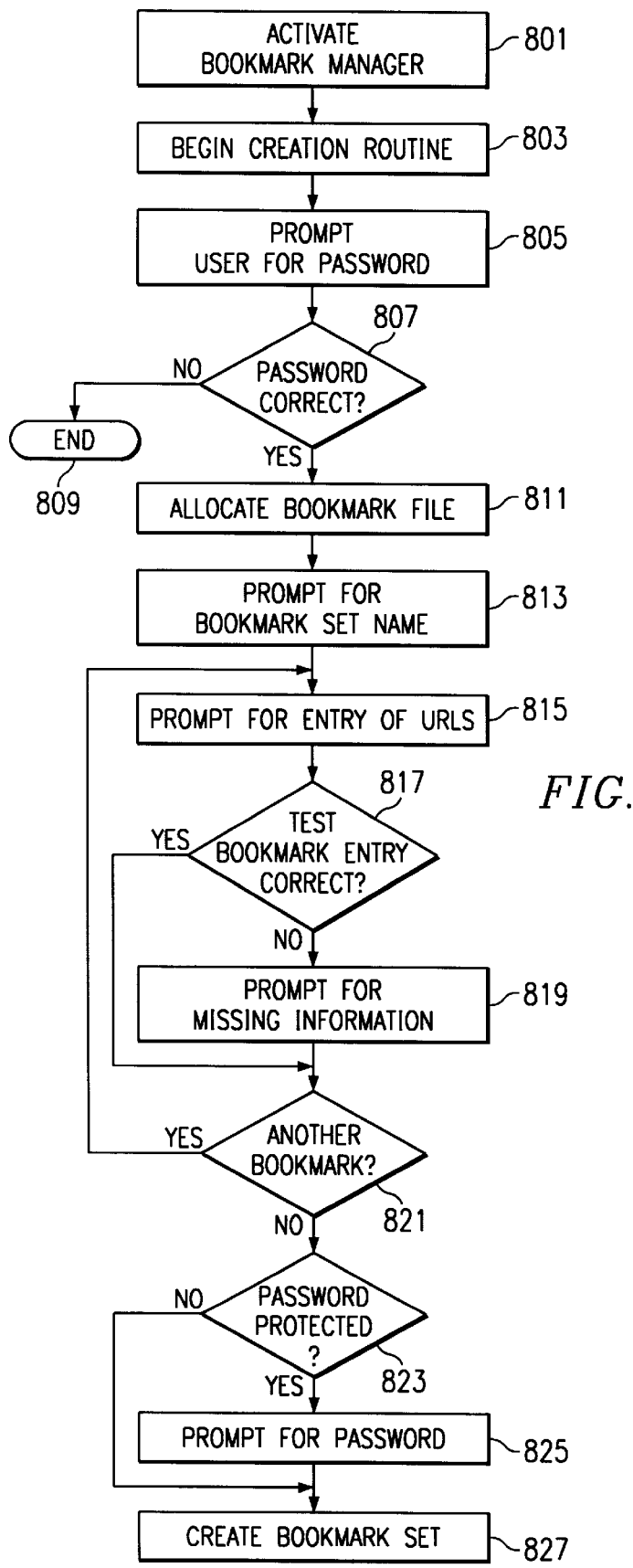
FIG. 8 is a flow diagram for creating a bookmark set.

A method, alternative to the registration page method above, of creating a bookmark set according to the invention is shown in FIG. 8. Those skilled in the art will recognize that other steps in other user interfaces may be used to assemble a bookmark set. In step 801, the bookmark manager or editor is activated in response to user selection of the create bookmark set item. In step 803, a creation routine for the bookmark set is initiated. Since altering a bookmark set may have a financial impact on the organization, bookmark set creation and modification may be password protected. In step 805, the user is prompted for a password. Step 807 tests whether the password was entered successfully. If not entered successfully within the number of attempts allowed by a security protocol, the process ends, step 809. At this point, other actions such as browser lockup, disconnect from the network as well as various alarms are possible.

Presuming the user successfully enters a password, in step 811, a new bookmark file is allocated for the new bookmark set. At the time of the creation of the bookmark set, the user is prompted for a name and a set of keywords for the bookmark set, step 813. Next, the user can specify a URL, i.e. bookmark, that belongs to the set, step 115. A text descriptor for each bookmark is also added in this step. An indicator that the bookmark is a variable bookmark, e.g., an "advertiser bookmark", is useful for easy substitution of new advertisers for subsequent versions of the bookmark set. If user profile or locale specific information is used to determine which variable bookmark is served to a client browser, this information is associated with a particular bookmark set. The system tests each bookmark set for a bookmark set name and at least one URL in the bookmark set, step 817. If not, the user is prompted that there is not enough information to create a bookmark set, step 819, and given an opportunity to provide the missing information. In step 821, the user is asked whether there is another bookmark to add to the set. If so, the process returns to step 815.

The user is queried whether the bookmark set is to be password protected, in step 823. The user is prompted for the password which becomes part of the bookmark set, step 825. Step 827 represents the creation of the bookmark set and its submission to the bookmark set server as a searchable bookmark set. Once created, the clients with the appropriate authorization can retrieve the bookmark set from the server.

From a user interface standpoint, it is a single step process to add a bookmark set in an easy, automatic and painless way. A special tag or MIME type can identify the nature of the file, i.e. a bookmark set, to be transferred. The bookmark set manager in the browser uses these tags or MIME types to add the bookmark set to the browser's collection of bookmarks.

In one preferred embodiment, upon receipt of the new bookmark set, the bookmark set manager makes the new set the active bookmark set and thus renders the included URLs available for browser use immediately.

One feature of the invention allows the user to assign an attribute to the newly served bookmark set. At download, a dialog box is presented, asking the user if the bookmark set is to be a temporary or permanent bookmark set. A temporary bookmark set is a good choice for a search which will not last beyond the current session. If a permanent bookmark set is chosen, the bookmark set becomes a permanent part of the browser (until deleted). Next, another dialog box is presented, asking the user if he wants to subscribe to the bookmark set for updates.

In the preferred embodiment, a bookmark set is detected by the browser by parsing the HTML returned by the server for a unique tag. That is, the bookmark set is specified through a unique MIME type, e.g., x-bookmark-set, that is added to the browser's bookmark options. For example, the HTML for adding a bookmark set for a computer manufacturer would look like:

Content_type: text/Bookmark set <line feed> <line feed>
   <HTML> <HEAD><TITLE> GM Bookmark sets </TITLE> </HEAD> </HTML>

While many industries that can benefit from aggregating web based information as prepackaged URLS, i.e. as bookmark sets, which are retrievable based on predetermined search criteria, a few examples are given below.

For example, a research institution or company can benefit from pre-packaging book information by "topics" or "authors" on sets of URLS, i.e. bookmark sets, that can direct the user to the electronic review of the selected subject. A student performing research on Shakespeare should be able to search for a bookmark set on Shakespeare, probably one of many, and download the selected bookmark set to his/her computer to review a selected set of "most important" URLs related to Shakespeare. As mentioned above, using today's available search technology, independently repeating this research takes a considerable amount of time to collect meaningful URLs.

Another application of the invention would be for a hospital or doctor to advertise their services. Bookmark sets on "cancer", "breast cancer", "heart disease" and so forth would include bookmarks to web pages containing articles on such topics. In addition, these bookmark sets would contain bookmarks to a hospital or doctor offering services for these conditions. The better the set of articles, the more likely a patient would be inclined to contact the doctor or hospital included in the bookmark set. Thus, there exists a potential market for bookmark set providers, either to provide a bookmark set to the hospital on a one time fee basis or as an ongoing fee as an advertisement.

Yet another application would be an online travel site. With the input of a destination keyword, e.g., Orlando, the client browser could be served a bookmark set complete with URLs to hotel and restaurant guides for the area, vacation club materials, weather reports and a web page integrating air, car and hotel reservations customized for the client.

A bookmark serving site known for the quality of its bookmark sets could command a premium fee for sole inclusion in a given bookmark set. As discussed above, the advertising bookmarks could vary by region, thus allowing for multiple fee arrangements with different advertisers. Based on the origin of the client browser request, or according to the geographic region input by the user, different hospitals' or doctors' URLs can be inserted into the same basic set of informational bookmarks.

Another potential opportunity for payment is the invention's ability to set a subscription attribute for a bookmark set. This allows the user to periodically update the information in his browser. A bookmark list which is updated monthly can have a different set of "advertisers", i.e. bookmarks to paying web sites. Presuming that the content, the list of URLs, is kept valuable and current, users will subscribe.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method for transmitting information and advertising in an Internet medium, comprising the steps of:

creating a bookmark set including informational bookmarks which point to respective informational files and one or more advertiser bookmarks each of which points to a service provider web page;

responsive to a client request for the bookmark set, serving the bookmark set from a server to a requesting client;

responsive to a subscription request for the served bookmark set, at the server, designating the served bookmark set for periodic updates to the requesting client; and periodically serving updated versions of the served bookmark set to the requesting client, wherein at least one of the advertiser bookmarks changes with each updated version of the served bookmark set;

wherein each successive version of the served bookmark set is installable as a unit in a client browser of the requesting client replacing a prior version of the served bookmark set such that the bookmark set is persistently available with the client browser and can be accessed through the client browser without input of a URL designating the server.

2. The method as recited in claim 1, further comprising the steps of:

storing a plurality of bookmark sets at the server, each bookmark set associated with a set of keywords; and searching for bookmark sets associated with keywords which match those in a search request from the requesting client.

3. The method as recited in claim 1, further comprising the steps of:

determining client specific information associated with the client request; and modifying the included advertiser bookmarks according to the client specific information.

4. The method as recited in claim 1, further comprising the steps of:

establishing an account representing a given monetary value for the requesting client;

associating a client identifier with account information; and determining the client identifier of the requesting client before serving the served bookmark set to the requesting client.

5. The method as recited in claim 2, wherein the plurality of bookmark sets are stored and maintained by a first party, and the method further comprises the steps of:

establishing an account representing a given monetary value for a second party;

receiving a request to incorporate an advertising bookmark in an updated version of a bookmark set; and debiting the account for a given charge for storing and serving the advertising bookmark in the bookmark set.

6. The method as recited in claim 1, further comprising the steps of:

detecting a change in the informational bookmarks in the bookmark set; and serving an updated version of the bookmark set to the requesting client.

7. The method as recited in claim 1, wherein the bookmark set is updated and served according to a predetermined period of time.

8. A system for transmitting information and advertising in an Internet medium, comprising;

means for creating a bookmark set including informational bookmarks which point to respective informational files and one or more advertiser bookmarks each of which points to a service provider web page;

means responsive to a client request for the bookmark set for serving the bookmark set for serving the bookmark set from a server to a requesting client;

means responsive to a subscription request for the served bookmark set for designating the served bookmark set for periodic updates to the requesting client; and means for periodically serving updated versions of the served bookmark set to the requesting client, wherein at least one of the advertiser bookmarks changes with each updated version of the served bookmark set;

wherein each successive version of the served bookmark set is installable as a unit in a client browser of the requesting client replacing a prior version of the served bookmark set such that the bookmark set is persistently available with the client browser and can be accessed through the client browser without input of a URL designating the server.

9. The system as recited in claim 8, further comprising:

means for storing a plurality of bookmark sets at the server, each bookmark set associated with a set of keywords; and means for searching for bookmark sets associated with keywords which match those in a search request from the requesting client.

10. The system as recited in claim 8, further comprising:

means for determining client specific information associated with the client request; and means for modifying the included advertiser bookmarks according to the client specific information.

11. The system as recited in claim 8, further comprising the steps of:

means for establishing an account representing a given monetary value for the requesting client;

means for associating a client identifier with account information; and means for determining the client identifier of the requesting client before serving the served bookmark set to the requesting client.

12. The system as recited in claim 9, wherein the plurality of bookmark sets are stored and maintained by a first party, and the system further comprises:

means for establishing an account representing a given monetary value for a second party;

means for receiving a request to incorporate an advertising bookmark in an updated version of a bookmark set; and means for debiting the account for a given charge for storing and serving the advertising bookmark in the bookmark set.

13. The system as recited in claim 8, further comprising the steps of:

means for detecting a change in the informational bookmarks in the bookmark set; and means for serving an updated version of the bookmark set to the requesting client.

14. The system as recited in claim 8, wherein the bookmark set is updated and served according to a predetermined period of time.

15. A computer product in a computer readable medium for transmitting information and advertising in an Internet medium, comprising:

means for creating a bookmark set including informational bookmarks which point to respective informational files and one or more advertiser bookmarks each of which points to a service provider web page;

means, responsive to a client request for the bookmark set, for serving the bookmark set from a server to a requesting client;

means, responsive to a subscription request for the served bookmark set, at the server, for designating the served bookmark set for periodic updates to the requesting client; and means for periodically serving updated versions of the served bookmark set to the requesting client, wherein at least one of the advertiser bookmarks changes with each updated version of the served bookmark set and wherein each successive version of the served bookmark set is installable as a unit in a client browser of the requesting client replacing a prior version of the served bookmark set such that the bookmark set is persistently available with the client browser and can be accessed through the client browser without input of a URL designating the server.

16. The product as recited in claim 15, further comprising the steps of:

means for storing a plurality of bookmark sets at the server, each bookmark set associated with a set of keywords; and means for searching for bookmark sets associated with keywords which match those in a search request from the requesting client.

17. The product as recited in claim 15, further comprising the steps of:

means for determining client specific information associated with the client request; and means for modifying the included advertiser bookmarks according to the client specific information.

18. The product as recited in claim 15, further comprising the steps of:

means for establishing an account representing a given monetary value for the requesting client;

means for associating a client identifier with account information; and means for determining the client identifier of the requesting client before serving the served bookmark set to the requesting client.

19. The product as recited in claim 16, wherein the plurality of bookmark sets are stored and maintained by a first party, and the method further comprises the steps of:

means for establishing an account representing a given monetary value for a second party;

means for receiving a request to incorporate an advertising bookmark in an updated version of a bookmark set; and means for debiting the account for a given charge for storing and serving the advertising bookmark in the bookmark set.

20. The product as recited in claim 15, further comprising the steps of:

means for detecting a change in the informational bookmarks in the bookmark set; and means for serving an updated version of the bookmark set to the requesting client.

\* \* \* \* \*